United States Patent [19]

Fujioka

[11] Patent Number: 5,661,286
[45] Date of Patent: Aug. 26, 1997

[54] NONCONTACTING IC CARD SYSTEM AND GATE FACILITY AND ANTENNA MECHANISM

[75] Inventor: Shuzo Fujioka, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 541,449

[22] Filed: Oct. 10, 1995

[30] Foreign Application Priority Data

Nov. 15, 1994 [JP] Japan ................... 6-280544

[51] Int. Cl.⁶ .................................. G06K 5/00
[52] U.S. Cl. ........................... 235/382; 235/384
[58] Field of Search .............. 342/51; 235/380, 235/382, 392, 384; 340/825.31, 825.34; 343/841

[56] References Cited

U.S. PATENT DOCUMENTS

| | | | |
|---|---|---|---|
| 3,501,622 | 3/1970 | Weir et al. | 235/384 |
| 4,459,474 | 7/1984 | Walton | 235/380 |
| 4,506,267 | 3/1985 | Harmuth | 343/744 |
| 4,977,619 | 12/1990 | Crimmins | 455/607 |
| 5,066,853 | 11/1991 | Brisson | 235/384 |
| 5,202,550 | 4/1993 | Kocznar et al. | 235/382 |
| 5,212,373 | 5/1993 | Fujioka et al. | 235/492 |
| 5,220,158 | 6/1993 | Takahira et al. | 235/492 |
| 5,424,727 | 6/1995 | Shieh | 235/484 X |
| 5,478,995 | 12/1995 | Wallerstorfer et al. | 340/825.31 |
| 5,485,520 | 1/1996 | Chaum et al. | 340/825.31 |

FOREIGN PATENT DOCUMENTS

| | | | |
|---|---|---|---|
| 0215266 | 3/1987 | European Pat. Off. . | |
| 0367725 | 5/1990 | European Pat. Off. | 235/384 |
| 2682206 | 4/1993 | France | 235/382 |
| 3250391 | 11/1991 | Japan | 235/384 |
| 464975 | 4/1937 | United Kingdom . | |
| 1516006 | 6/1978 | United Kingdom . | |
| 2003703 | 3/1979 | United Kingdom . | |
| 2106757 | 4/1983 | United Kingdom . | |
| 2276494 | 9/1994 | United Kingdom . | |
| WO89/07347 | 8/1989 | WIPO . | |
| 9003016 | 3/1990 | WIPO | 235/384 |
| 9014640 | 11/1990 | WIPO | 235/384 |

*Primary Examiner*—Donald T. Hajec
*Assistant Examiner*—Thien Minh Le
*Attorney, Agent, or Firm*—Leydig, Voit & Mayer

[57] ABSTRACT

A noncontacting IC card system occupying a relatively small area without requiring a provision for a dead zone or unnecessary communication area outside a gate. A transmitting antenna 11 is provided between two contiguous gates i.e., on the inner sides of the gates, and receiving antennas are provided respectively toward the sides opposite to the transmitting antenna of the gates i.e., on the outer sides of the gates. It is thereby not necessary to provide a dead zone between the gates and an unnecessary communication area does not occur outside the gate.

10 Claims, 11 Drawing Sheets

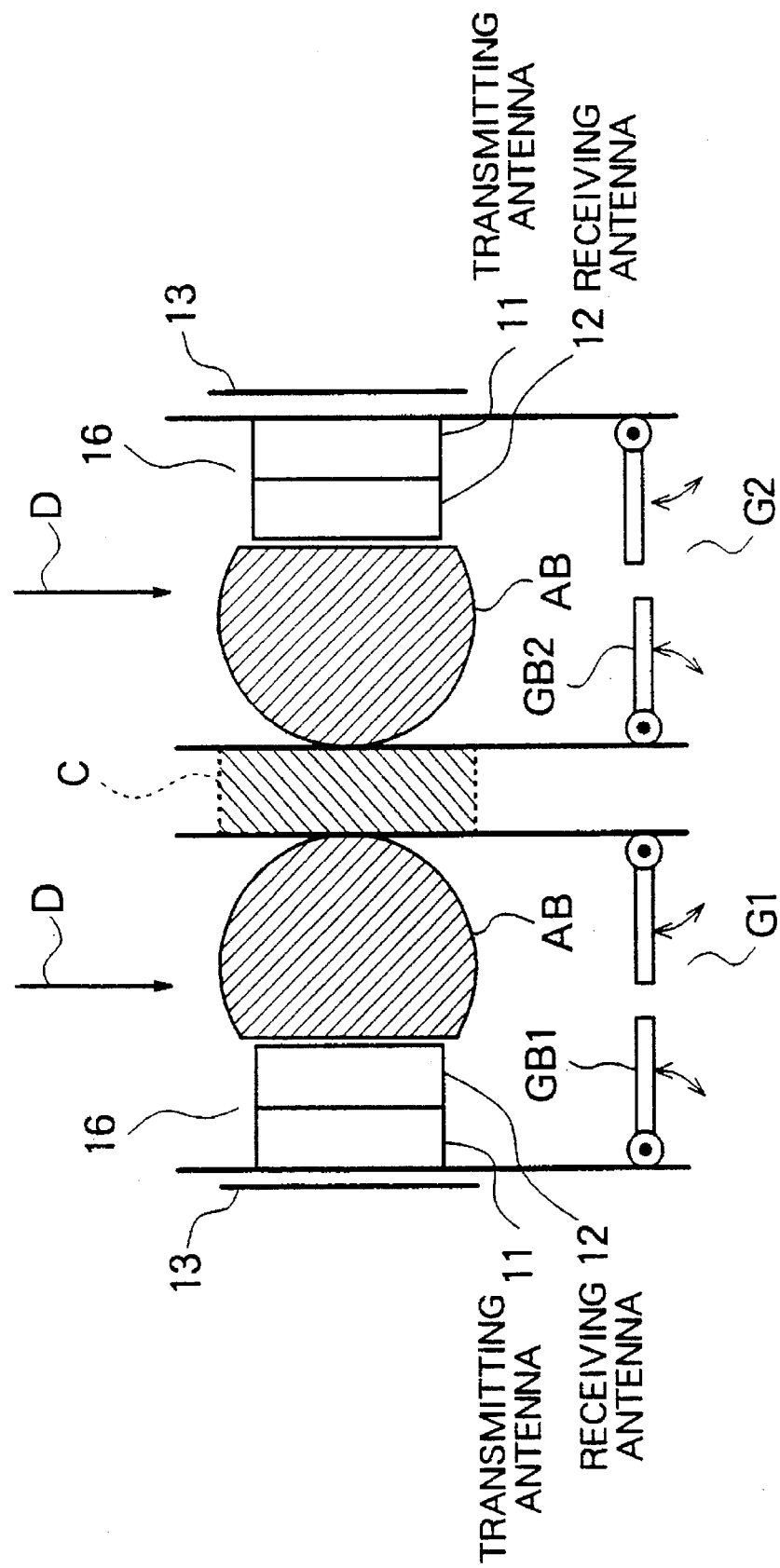

NONCONTACTING IC CARD SYSTEM AND GATE FACILITY AND ANTENNA MECHANISM

BACKGROUND OF THE INVENTION

1. Field of the Invention

The present invention relates to a noncontacting IC card system for use in exchanging data by using electromagnetic waves, and more particularly, a noncontacting IC card system applied to a gate facility using intermediate or long waves.

2. Description of the Related Art

FIG. 15 schematically illustrates a gate facility to which a known noncontacting IC card system is applied. In this figure, G1, G2 are gates, respectively. Denoted by numeral 1 is a user of the gate facility who carries a noncontacting IC card 20 and 2, 3 are gate partition plates, respectively. An antenna to be described later (see FIG. 16) is provided on each gate partition plate 2.

The user 1 advances, for example, in the direction from the reverse surface to the front surface of FIG. 15 within the gate G1 or G2. During this time period, communication is effected between an antenna located within the gate partition plate 2 and the carried noncontacting IC card (hereinafter referred to simply as a card) 20. Only if, as a result of such communication, the user 1 is determined as a person who has received permission for passage, the gate barrier (see FIG. 16) located on the foreside of FIG. 15 is opened so that the user 1 may advance further.

FIG. 16 is a top view of the gate facility as shown in FIG. 15. In this figure, denoted by numeral 10 is a transmitting/receiving antenna, and GB1 and GB2 are gate barriers, respectively. Further, included in this figure are: a communication area AB of the transmitting/receiving antenna occurring within the gate; a communication area X occurring outside the gate; a dead zone C provided to avoid an interference between the transmitting/receiving antennas 10 of the gates G1, G2; and D which indicates the traveling direction of a user.

FIG. 17 illustrates construction of the control system of a gate (G1 or G2). Included in this figure are: a controller 30 connected to the transmitting/receiving antenna 10; a host computer 40; and a gate barrier opening/closing control section 50. The controller 30 controls communication and processes data between the card 20 and the transmitting/receiving antenna 10. The result of processing is transmitted to the host computer 40. Then, the host computer 40, for example, provides a command for opening/closing the gate barrier GB1 or GB2 to the gate barrier opening/closing control section 50.

In some cases, as indicated by a broken line in FIG. 17, the controller 30 directly controls the gate barrier opening/closing control section 50 without the host computer 40. In such a case, the host computer 40 is not necessary.

In FIG. 16, when the user passes the gate in the traveling direction D, communication between the transmitting/receiving antenna 10 and the card 20 is effected and, for example, the controller 30 reads through the transmitting/receiving antenna 10 such information as an ID code and the balance of the card 20. Based on this, a decision is made as to whether the gate barrier GB1 or GB2 is to be opened or not.

In this type of system, since an electromagnetic wave output from the transmitting/receiving antenna 10 is more intense than that from the card 20, a cross talk between the two transmitting/receiving antennas 10 (reception by the transmitting/receiving antennas 10 of the gate G2 of the electromagnetic wave transmitted by the transmitting/receiving antenna 10 of the gate G1) results if a large dead zone C is not provided. Accordingly, it is necessary to provide a separation between gates. Further it is necessary to prevent a person carrying a card from entering the communication area X outside the gate, so as to avoid communication with the card outside the gate.

Since the known noncontacting IC card system is constructed as described, gates that are next to each other must be spaced from each other to provide a dead zone C. Further, the gate facility must be disposed so as to take into consideration that a person carrying the card should not be permitted into the unnecessary communication area X which occurs outside the gate. Problems thus occur as that a large area is occupied by the gate facility as a whole.

SUMMARY OF THE INVENTION

To eliminate the above problems, it is an object of the present invention to provide a noncontacting IC card system occupying a relatively small area which does not require a consideration for a dead zone and an unnecessary communication area outside the gate.

Further, the present invention is also directed to a gate facility and an antenna mechanism of a noncontacting IC card system.

In view of the above objects, there is provided a noncontacting IC card system in accordance with the present invention, comprising: transmitting means provided between two contiguous gates; receiving means provided on said gates toward the sides opposite to the transmitting means; at least one noncontacting IC card being between and performing communication with the transmitting means and receiving means of each of the gates; and a control means connected to the transmitting means and receiving means for performing communication and data processing with the noncontacting IC card.

In accordance with one aspect of the invention, the transmitting means of the noncontacting IC card system comprises a transmitting antenna provided between the two contiguous gates and the receiving means comprises receiving antennas provided on the respective gates toward the sides opposite to the transmitting antenna.

In accordance with another aspect of the invention, the transmitting means of the noncontacting IC card system comprises a transmitting antenna provided between the two contiguous gates and the receiving means comprises a receiving antenna provided on one side of the two gates and having a reception area covering the two gates, and the noncontacting IC card system further comprises gate discriminating means for discriminating a gate having the noncontacting IC card existing therein based on a receiving voltage by a reception signal from the noncontacting IC card.

Further, in accordance with another aspect, the invention is directed to a noncontacting IC card system having the transmitting means and receiving means comprise antennas and an insulating antenna mounting support for mounting the antennas.

Furthermore, in accordance with another aspect, the invention is directed to a gate facility based on the above described systems.

In accordance with a further aspect of the invention, there is provided an antenna mechanism for a noncontacting IC card system for performing communication with a noncontacting IC card passing a gate, the antenna mechanism comprising: an antenna; and a conductive shielding body provided on the outer side with respect to the gate of the antenna to eliminate a communication area outside the gate by cutting off electromagnetic waves.

In accordance with another aspect of the invention, the conductive shielding body of the antenna mechanism for noncontacting IC card system comprises a conductive shielding body in the form of a box covering the surfaces of the antenna except the surface for performing communication.

In accordance with another aspect of the invention, the antenna includes at least a receiving antenna, and the antenna mechanism for the noncontacting IC card system further comprises ground means for connecting the conductive shielding body to ground at the same electric potential as the receiving antenna.

In accordance with another aspect of the invention, the antenna mechanism for the noncontacting IC card system further comprises an insulating antenna mounting support for mounting the antenna.

In accordance with the invention, the transmitting means is provided between two contiguous gates, i.e., on the inner side of the gates and the receiving means are provided toward the sides opposite to the transmitting means, i.e., on the outer sides of the gates. No dead zone is thus needed and an unnecessary communication area does not occur outside the gate.

The transmitting means comprises a transmitting antenna provided between two contiguous gates and the receiving means comprises receiving antennas on the gates provided respectively toward the sides opposite to the transmitting antenna. The transmitting antenna is shared by the two gates, and reception of a signal from the card is performed by each individual gate Alternatively, the transmitting means comprises a transmitting antenna provided between two contiguous gates and the receiving means comprises a receiving antenna provided on one side of the two gates and having a reception area covering the two gates. The transmitting antenna and the receiving antenna are respectively shared by the two gates.

A conductive shielding body provided on the outer side with respect to the gate of the antenna cuts off electromagnetic waves to eliminate a communication area outside the gate.

The conductive shielding body is formed into a box covering the surfaces of the antenna, except the surface for performing communication, to enhance the shielding effect.

The conductive shielding body is connected to a ground at the same electric potential as the receiving antenna so that the receiving antenna is less likely to be affected by noise due to the shielding body.

An antenna mounting support for mounting the antenna is formed by an insulating material to prevent a leakage of electromagnetic waves to the outside of the gate due to propagation through the support.

BRIEF DESCRIPTION OF THE DRAWINGS

FIG. 11 is a top view of the gate facility to which a noncontacting IC card system according to another embodiment of the invention is applied.

DESCRIPTION OF THE PREFERRED EMBODIMENTS

Exemplary embodiments of the present invention will now be described in accordance with the drawings.

Embodiment 1

Figure 1:
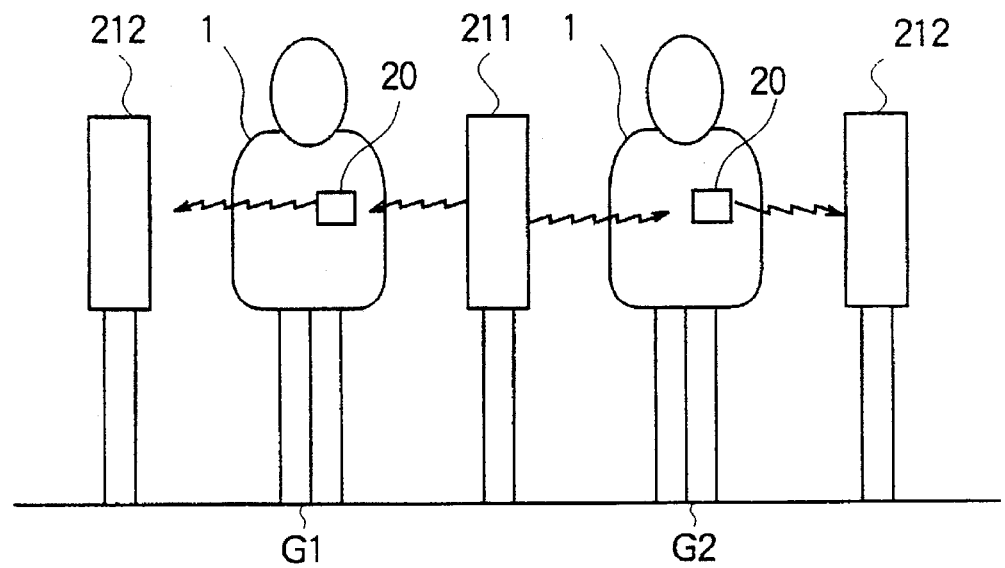
FIG. 1 schematically shows a gate facility to which a noncontacting IC card system according to an embodiment of the invention is applied.

FIG. 1 schematically shows a gate facility to which the noncontacting IC card system according to an exemplary embodiment of the invention is applied. In this figure, G1 and G2 represent gates, respectively. Denoted by numeral 1 is a user of the gate facility who possesses a noncontacting IC card 20, and denoted by 211 and 212 are gate partition plates, respectively. A transmitting antenna (denoted by 11 in FIG. 2) to be described later is provided on the gate partition plate 211 and a receiving antenna (denoted by 12 in FIG. 2) is provided on the gate partition plate 212.

The user 1 advances, for example, in the direction from the reverse surface to the front surface of FIG. 1 within the gate G1 or G2. During this time period, communication is effected between the antennas located within the gate partition plates 211, 212 and the carried card 20. Only if, as a result of such communication, the user 1 is determined as a person who has received a permission for passage, the gate barrier (denoted by GB1, GB2 in FIG. 2) located on the foreside of FIG. 1 is opened so that the user 1 may advance further.

Figure 2:
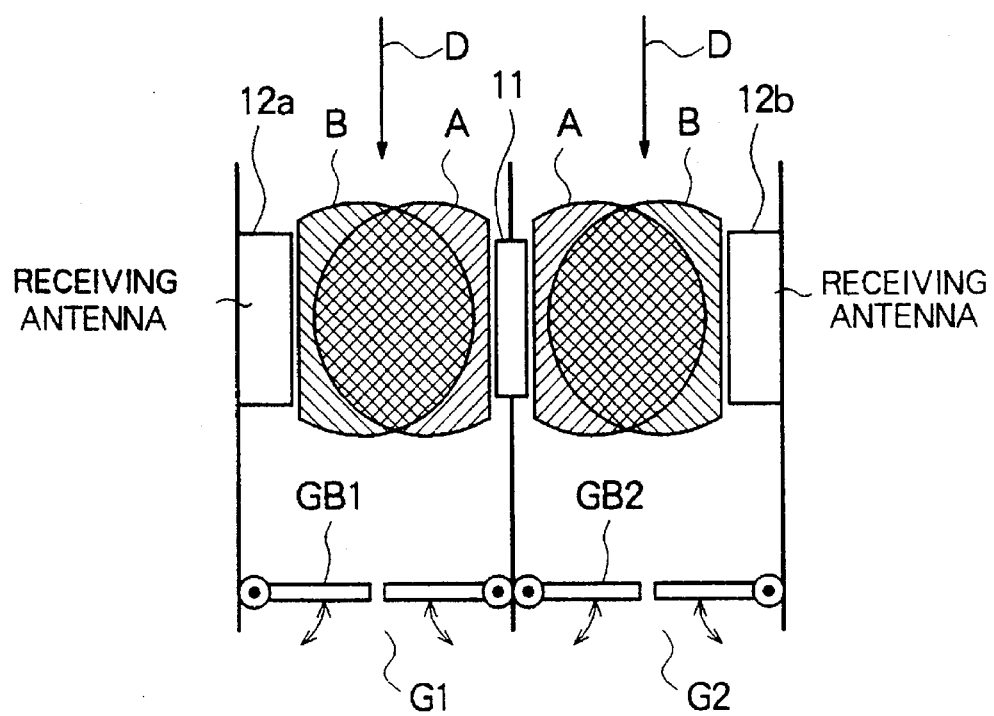
FIG. 2 is a top view of the gate facility of FIG. 1.

FIG. 2 is a top view of the gate facility as shown in FIG. 1. In this figure, denoted by numeral 11 is a transmitting antenna provided between the two gates G1 and G2 that are contiguous to each other, and denoted by 12A and 12B are receiving antennas for receiving signals from the card 20, respectively, provided toward the opposite sides to the transmitting antenna 11 of the respective gates G1 and G2. The transmitting antenna 11 is shared by the two gates G1, G2.

Further, denoted by A is a transmitting area of the transmitting antenna 11 and B is a receiving area of the receiving antennas 12. A portion of the transmitting area A overlapping the receiving area B comprise a communication area. An arrow D represents the traveling direction of the user.

Figure 16:
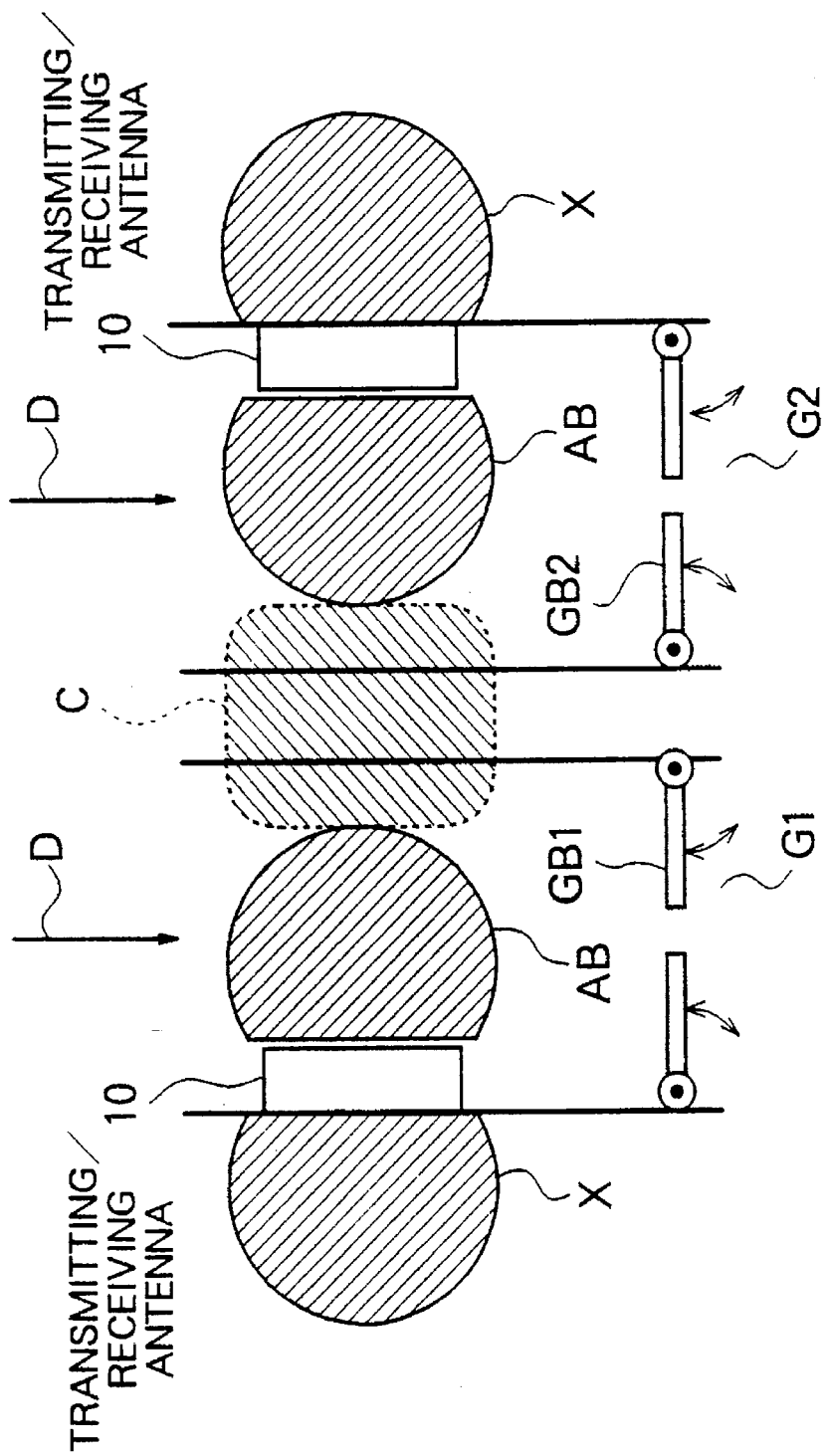
FIG. 16 is a top view of the gate facility of FIG. 15.
Figure 17:
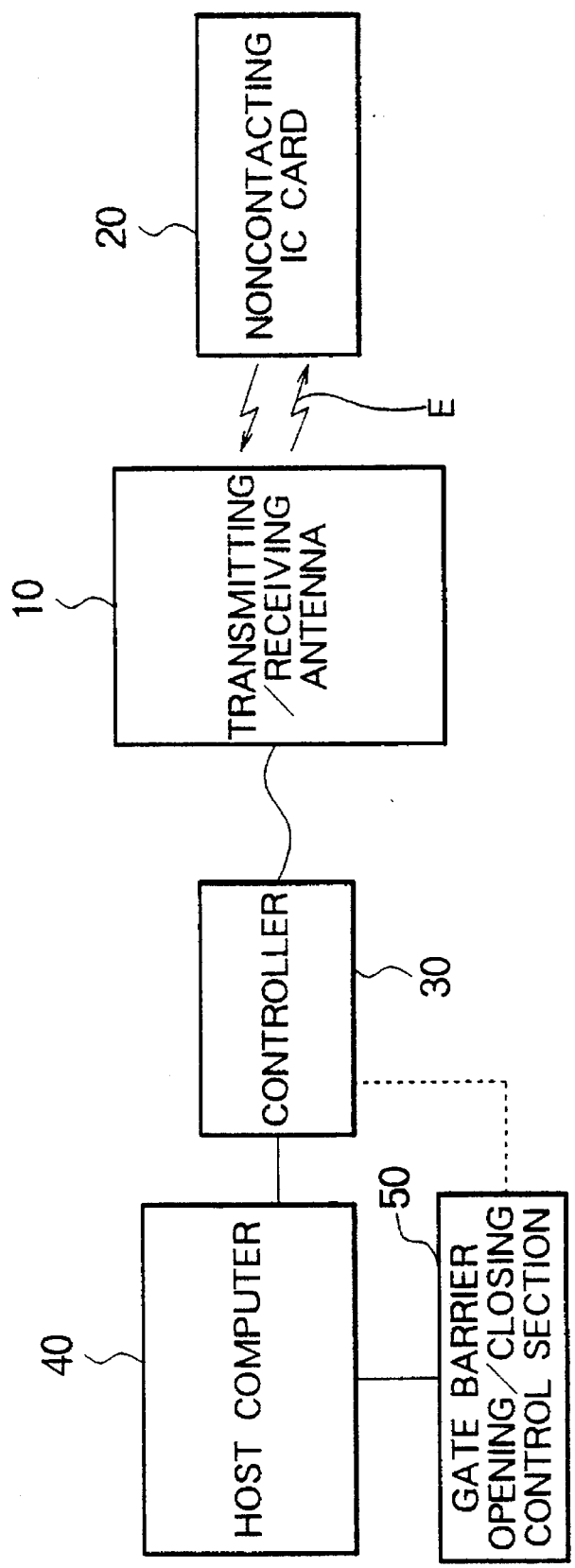
FIG. 17 shows construction of the control system of the gate facility as shown in FIGS. 15 and 16.

In this embodiment, that is, the transmitting antenna 11 is provided between the two contiguous gates, i.e., at the inner side thereof and the receiving antennas 12a and 12b are provided toward the sides opposite to the transmitting antenna 11, i.e., on the outer sides, of the respective gates G1 and G2. It is not necessary to provide a dead zone C as shown in FIG. 16 of the known system, and unnecessary communication areas X do not occur at the outside of the gates G1, G2.

Figure 3:
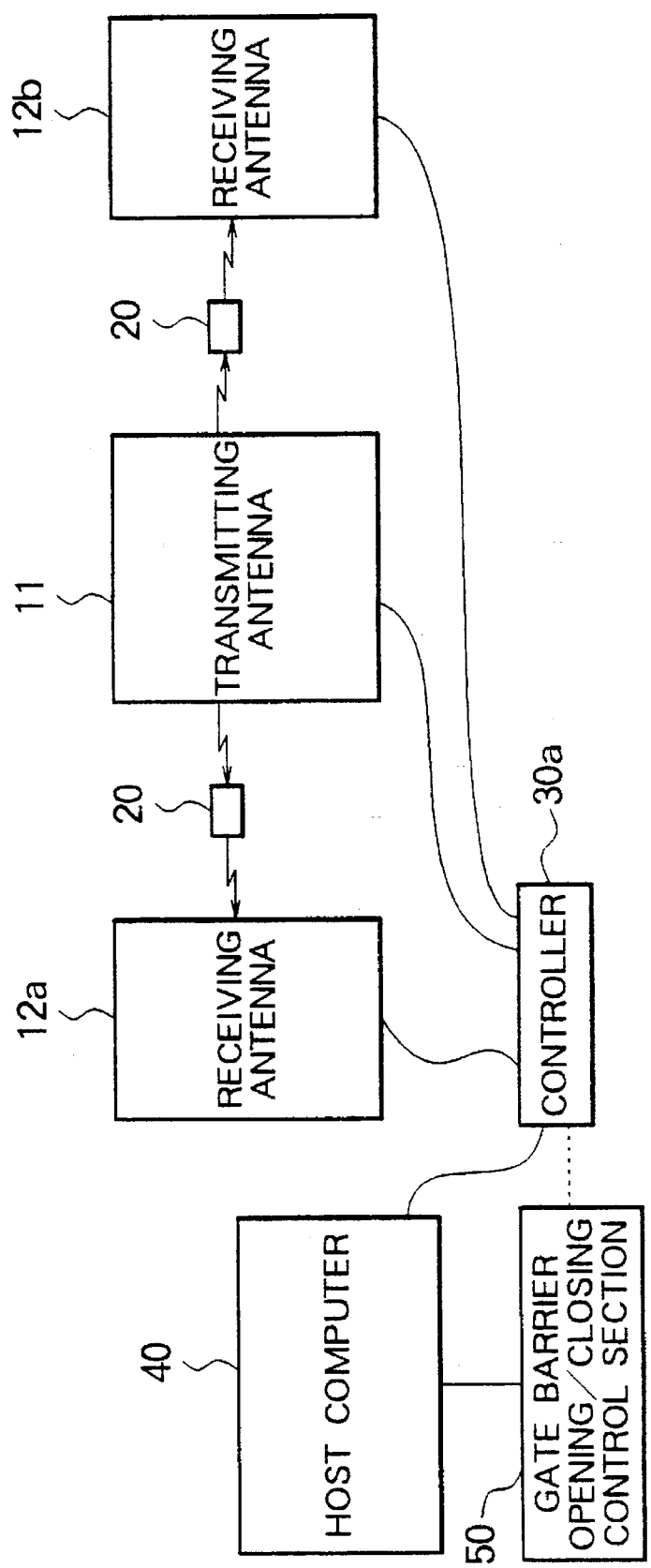
FIG. 3 shows construction of the control system of the gate facility as shown in FIGS. 1 and 2.

FIG. 3 shows the control system of this gate facility. Included in this figure are: a controller 30a connected to the receiving antennas 12a, 12b; a host computer 40; and a gate barrier opening/closing control section 50. The controller 30a performs control of communication and data processing between the card 20 and the transmitting antenna 11, the receiving antennas 12a, 12b, the result of processing being transmitted to the host computer 40. The host computer 40 then provides, for example, an opening/closing operation command for the gate barrier GB1 or GB2 to the gate barrier opening/closing control section 50.

In some cases, as indicated by a broken line in FIG. 3, the controller 30a directly controls the gate barrier opening/closing control section 50 without the host computer 40. In such a case, the host computer 40 is not necessary.

Figure 4:
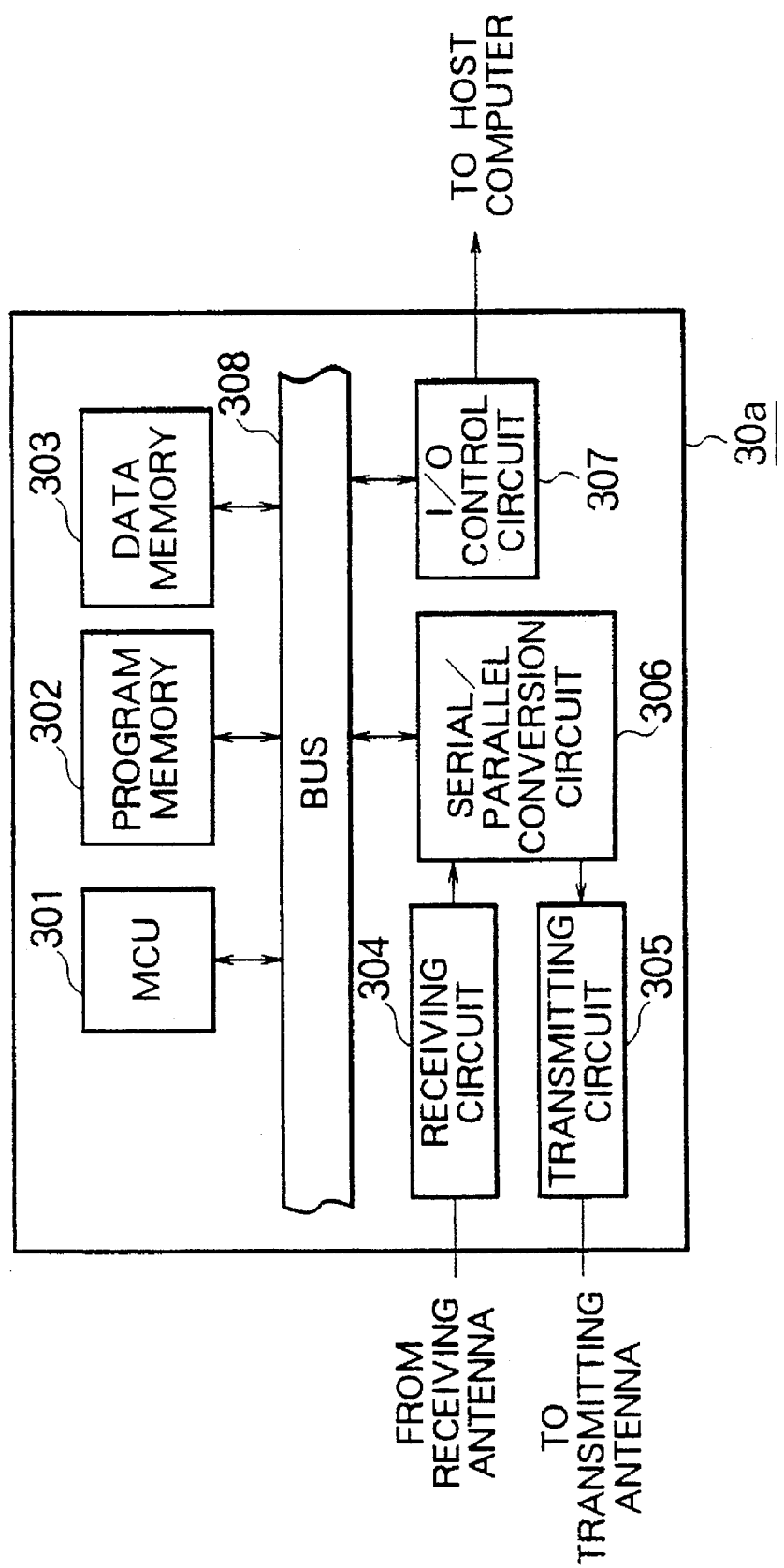
FIG. 4 schematically shows construction of the controller of FIG. 3.

FIG. 4 schematically shows the construction of the controller 30a. Included in this figure are: MCU 301 for performing functions including communication control and data processing; a program memory 302 storing an operation program for operating the MCU 301; a data memory 303 comprising a RAM or EEPROM for temporarily storing data; a receiving circuit 304 for receiving and demodulating reception signals from the receiving antennas 12a, 12b; a transmitting circuit 305 for modulating a transmitting signal and driving the transmitting antenna 11; a serial/parallel conversion circuit 306 for converting a reception signal in the form of a serial signal from the receiving circuit 304 into a parallel signal and for converting transmitting signal in the form of a parallel signal into a serial signal; an I/O control circuit 307 for controlling input/output to/from the host computer 40; and a bus 308 for interconnecting these components.

It should be noted that the transmitting antenna 11 comprises the transmission means, the receiving antennas 12a, 12b comprises the receiving means, and the controller 30a comprises the control means.

Figure 5:
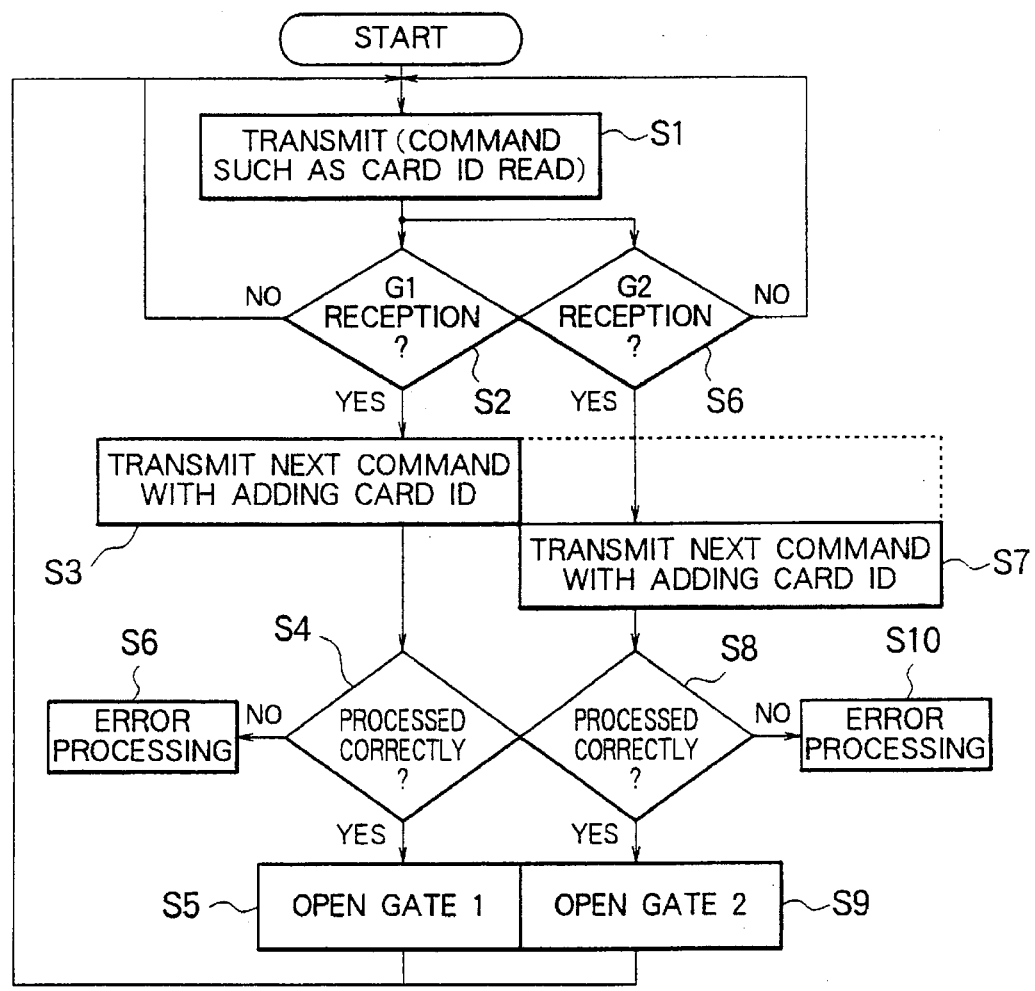
FIG. 5 is a flowchart showing the operation of the controller of Embodiment 1 of the invention.

Operation of this exemplary embodiment will be described below. FIG. 5 is a flowchart showing the operation of the controller 30a. Operation is performed in accordance with an operation program stored in the program memory as shown in FIG. 4. The transmitting antenna 11 continuously transmits a trigger signal to the card 20 and commands as such ID read command (command for reading ID code of the card) (step S1). Upon the entrance of a user 1 carrying the card 20 into the communication area of FIG. 2 where the transmitting area A and the receiving area B are overlapped by each other, the card 20 is driven to start communication.

When the result of execution of command is received from the card 20 (steps S2, S6), a command to be executed next with ID of the card being added is then transmitted (steps S3, S7). After receiving the result of execution with respect to such a command from the card, it is determined whether a predetermined processing is performed and whether the processing is effected correctly (steps S4, S8). If determined as correct, the gate barrier GB1 or GB2 of the gate in which the card exists is opened (steps S5, S9). Further, if processing is not performed correctly, an error processing such as an indication of an error for example by displaying or sound is performed (steps S6, S10).

Since there is only one transmitting antenna 11 in the construction of this embodiment, it is impossible to individually transmit to the cards 20 which simultaneously exist, respectively, in the two gates G1, G2. Thus, respective card ID is added and transmission is made in a manner of time division as indicated by a broken line in FIG. 5. Receiving operation may be simultaneously performed as the two receiving antennas 12a, 12b are provided.

Figure 6:
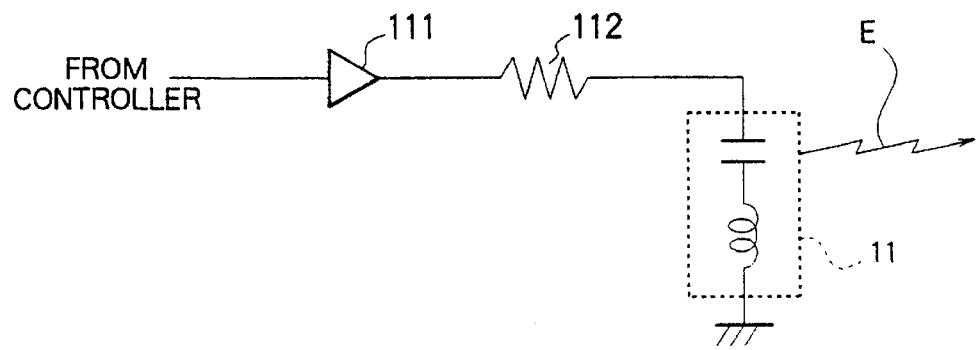
FIG. 6 shows an example of adjusting output of a transmitting antenna.

Further, while it is necessary to adjust the output of the transmitting antenna 11 so that the transmitting area A is not extended to the outside of the gate, it suffices to adjust it by connecting a resistor 112 having an appropriate resistance value between a transmitting amplifier 111 and the transmitting antenna 11 as shown in the example of FIG. 6. Specifically, if one with a larger resistance value is connected, the output is lowered. In some cases, the transmitting amp 111 is contained in the controller 30a.

As described above, in this embodiment, the transmitting antenna 11 is provided between the two contiguous gates G1 and G2 and the receiving antennas 12a, 12b are provided on the gates G1, G2, respectively, toward the sides opposite to the transmitting antenna. It is not necessary to provide a dead zone C and an unnecessary communication area X does not occur outside the gates G1, G2. Since it is not necessary to provide an additional space outside the gate, the area occupied by the gate facility, i.e., the system may be smaller.

Embodiment 2

FIG. 2 is a top view of a gate facility to which the noncontacting IC card system according to another embodiment of the invention is applied. Identical or corresponding parts as illustrated in FIG. 2 are denoted by identical reference numerals. In this embodiment, a receiving antenna 12 having a receiving area B covering the two gates G1, G2 is provided, Thereby, the two gates are covered by one transmitting antenna 11 and one receiving antenna 12.

Figure 8:
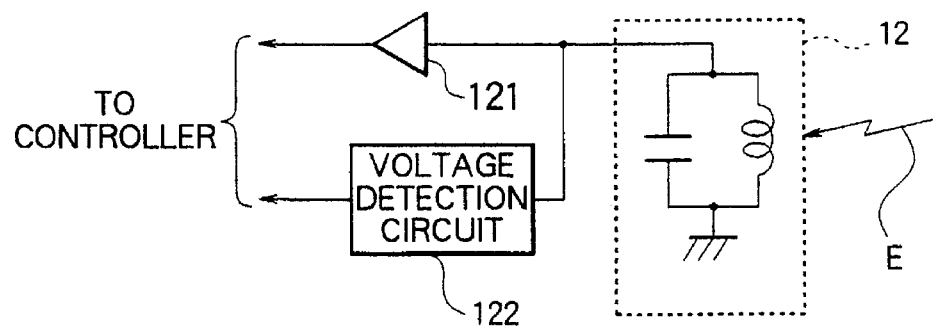
FIG. 8 shows an example of the circuit for discriminating a gate in which the card exists.

Further, judgement as to which one of the gates is used is made based on a detected voltage value for example by detecting a receiving voltage at the receiving antenna 12. Since the receiving voltage is substantially in inverse proportion to the cube of distance, even a small difference in distance may be detected from the receiving voltage. An example of this is shown in FIG. 8, Denoted by numeral 121 is a receiving amplifier (which is in some cases provided within the controller 30a) and 122 denotes a voltage detection circuit connected between the receiving amplifier 121 and the receiving antenna 12.

Figure 9:
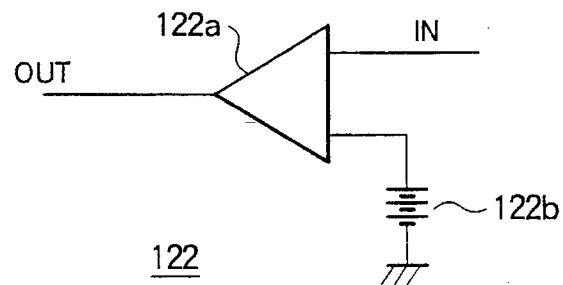
FIG. 9 shows an example of voltage detection circuit of FIG. 8.

The voltage detection circuit 122, as shown in. FIG. 9, includes a comparator 122a, output from the output terminal OUT of which is a signal indicating whether the receiving voltage at the receiving antenna 12 input from its input terminal IN is higher or lower than the voltage of a reference voltage source 122b.

For example, supposing that a receiving voltage of 200 mV is obtained at the center between the two gates G1, G2, i.e., at the position of the transmitting antenna 11, the reference voltage source 122b of FIG. 9 is set to 200 mV to determine, by the voltage detection circuit 122, whether the receiving voltage is higher or lower than 200 mV. By sending a level judgement signal to the controller 30a, the controller 30a is able to determine in which one of the gates the card 20 exists.

It should be noted that the transmitting antenna 11 comprises the transmission means, the receiving antenna 12 comprises the receiving means; the voltage detection circuit 122 comprises the gate discrimination means, and the controller 30a comprises control means.

Figure 7:
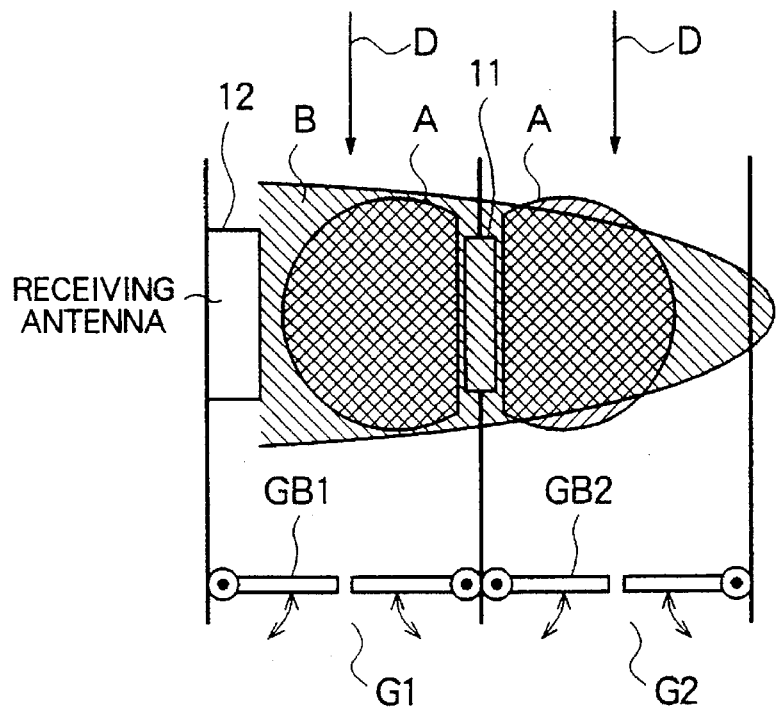
FIG. 7 is a top view of the gate facility to which a noncontacting IC card system according to another embodiment of the invention is applied.
Figure 10:
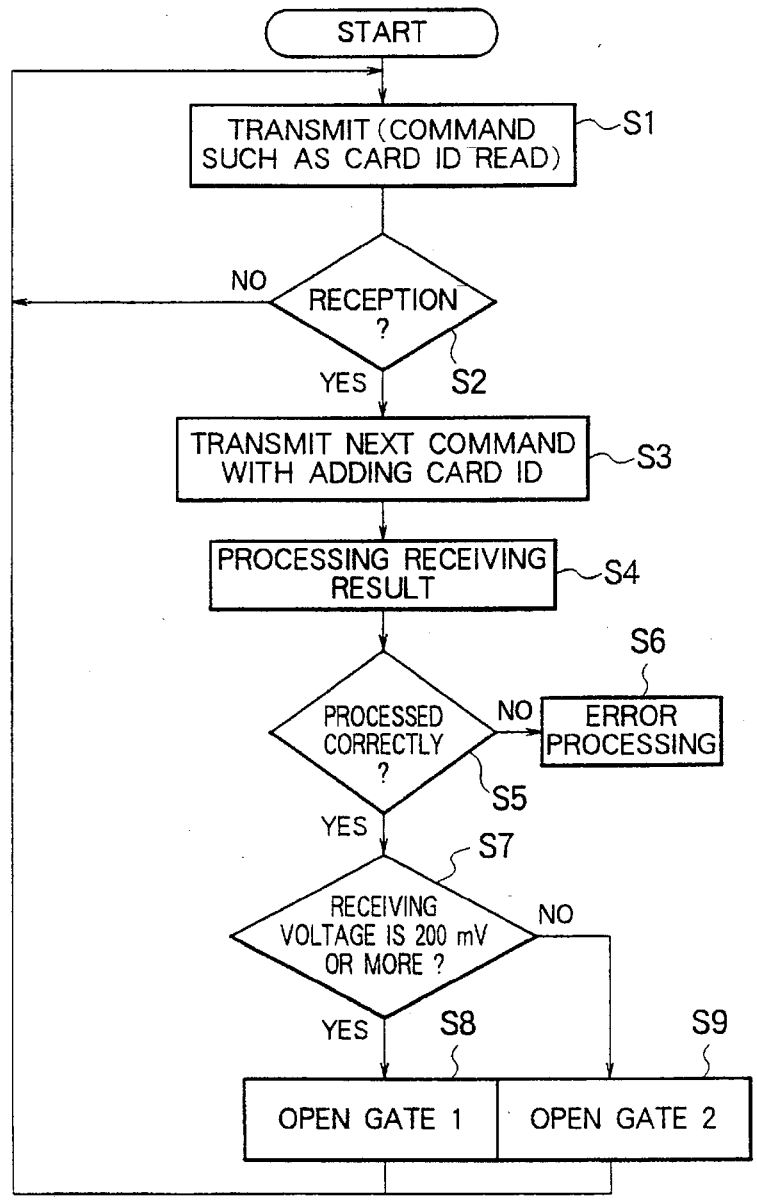
FIG. 10 is a flowchart showing the operation of the controller of Embodiment 2 of the invention.

Operation of this exemplary embodiment will be described below. FIG. 10 is flowchart showing the operation of the controller 30a of this embodiment. Such operation is performed in accordance with an operation program stored in the program memory as shown in FIG. 4. The transmitting antenna 11 continuously transmits a trigger signal to the card 20 and such commands as an ID read command (command for reading ID code of the card) (step S1). Upon entering of a user carrying the card 20 into the communication area of FIG. 7 where the transmitting area A and the receiving area B are overlapped by each other, the card 20 is driven to start communication.

When the result of the execution of a command is received from the card 20 (step S2), a command to be executed next with ID of the card being added is then transmitted (step S3). The result of the execution is then received from the card and a predetermined processing is performed (step S4).

It is then determined whether a correct processing is performed (step S5). If correct, it is determined whether the receiving voltage at the receiving antenna 12 is higher than 200 mV based on the level determination signal from the voltage detection circuit of FIG. 8 (step S7). If the voltage exceeds 200 mV, the gate barrier GB1 of the gate G1 which is nearer is opened (step S8), while, if lower than 200 mV, the gate barrier GB1 of the gate 2 which is farther is opened (step S9).

Further, if a correct processing is not performed at step S5, an error processing such as indication of an error for example by displaying or sound is performed (step S6).

It should be noted that, since there is only one receiving antenna 12, processing by means of time division is necessary if cards 20 have simultaneously entered the respective gates G1, G2.

As in the above described embodiments, in this embodiment, not only the transmitting antenna 11 but also the receiving antenna 12 may be served by a single unit, thereby it is possible to construct the system at a lower cost.

Embodiment 3

FIG. 11 is a top view of a gate facility to which the noncontacting IC card system according to a further embodiment of the invention is applied. Identical or corresponding parts as the above described embodiments are denoted by identical reference numerals. In particular, this embodiment relates to the structure of the antenna mechanism and aims at eliminating a communication area at the outside of the gate.

An antenna 16 comprising of a transmitting antenna 11 and a receiving antenna 12 is provided on the outer side of each the gates G1, G2. A conductive shielding body 13 for eliminating the communication area outside the gate is provided at the outside of each antenna 16. Thereby, electromagnetic wave output from the transmitting antenna 11 is cut off by the conductive shielding body 13 and does not come out to the outside of the gate.

It should be noted that an antenna mechanism comprises by the antenna 16 and the conductive shielding body 13.

The shielding body 13 constructed for example by iron, copper, aluminum or other materials having a high conductivity, and must be larger than the transmitting antenna 11. Further, while the area of the shielding body may be smaller as the distance between the shielding body 13 and the antenna 16 is smaller, a shorter communication area results if they are too close to each other. Thus, a suitable distance is provided. Further, since the receiving antenna 12 is more susceptible to noise as it is closer to the shielding body 13, the antenna 16 is disposed so that the transmitting antenna 11 is on the outer side, i.e., toward the shielding body 13. It should be noted that a dead zone C exists in this embodiment.

In this manner, the communication area outside the gate may be eliminated.

Embodiment 4

Figures 12A, 12B:
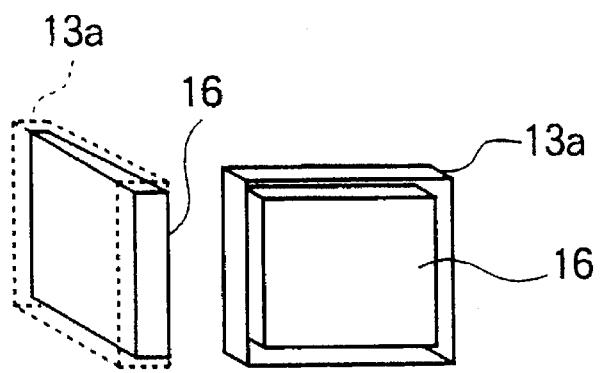
FIG. 12A is a perspective view as seen from a diagonally backward position of the antenna mechanism of the noncontacting IC card system according to another embodiment of the invention.
FIG. 12B is a perspective view of the same as seen from a diagonally frontward position thereof.

FIGS. 12A and 12B show an antenna mechanism according to another exemplary embodiment of the invention. FIG. 12A is a perspective view of the antenna mechanism as seen from a diagonally backward position and FIG. 12B is a perspective view of the same as seen from a diagonally frontward position. In this embodiment, the conductive shielding body of Embodiment 3 is served by a conductive shielding body 13a as shown in the form of a box covering the surfaces of the antenna 16 except the surface for performing communication. Thereby, the shielding body 13a may be smaller.

Embodiment 5

Figure 13:
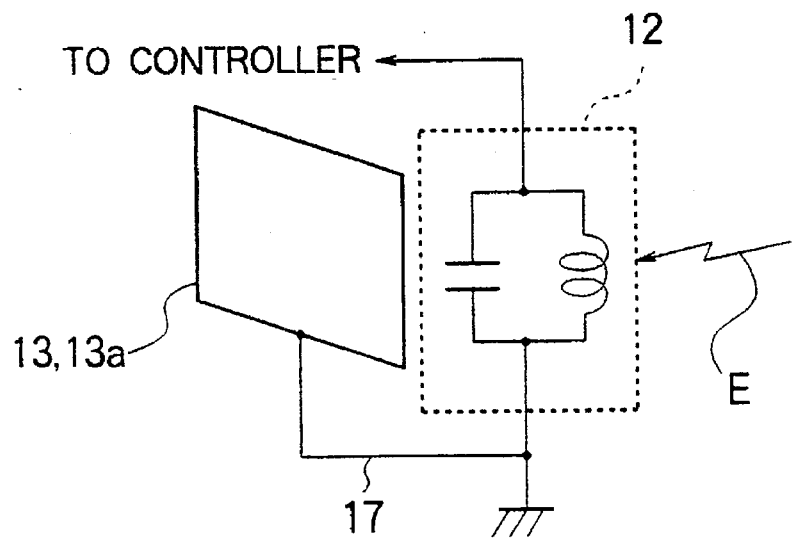
FIG. 13 shows the antenna mechanism of a noncontacting IC card system according to another embodiment of the invention.

FIG. 13 shows an antenna mechanism according to another exemplary embodiment of the invention. In this embodiment, the shielding body 13, 13a respectively of Embodiments 3, 4 is connected to ground of the receiving antenna 12 through a ground connecting line 17. Thereby, the receiving antenna 12 is less likely to be affected by noise coming from the shielding body 13, 13a. The ground connecting line comprises ground means.

Normal mode noise, i.e., the noise resulting from the shielding body 13, 13a alone passes to the ground. Common mode noise, i.e., resulting from the shielding body 13, 13a and the receiving antenna 12 together is reduced because the respective grounds of the two components are at the same potential. An actual measurement was made by adding a noise to the receiving antenna of the order of Q=300 which indicates the sharpness of resonance of a resonance circuit. When not connected to the ground, the antenna circuit received a noise at a noise voltage of 90 mV. However, when the shielding body 13, 13a is connected to the ground of the receiving antenna 12 as in this embodiment, no noise was received up to the voltage of 280 mV. The antenna thus become about three times more resistant to noise.

Embodiment 6

Figure 14:
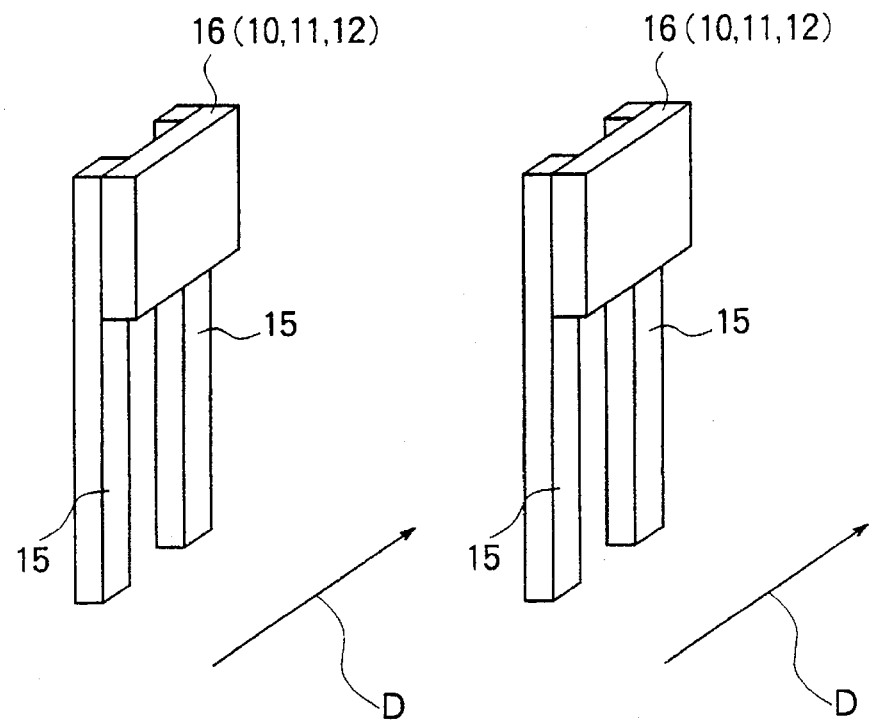
FIG. 14 is perspective view showing the antenna mechanism of a noncontacting IC card system according to another embodiment of the invention.
Figure 15:
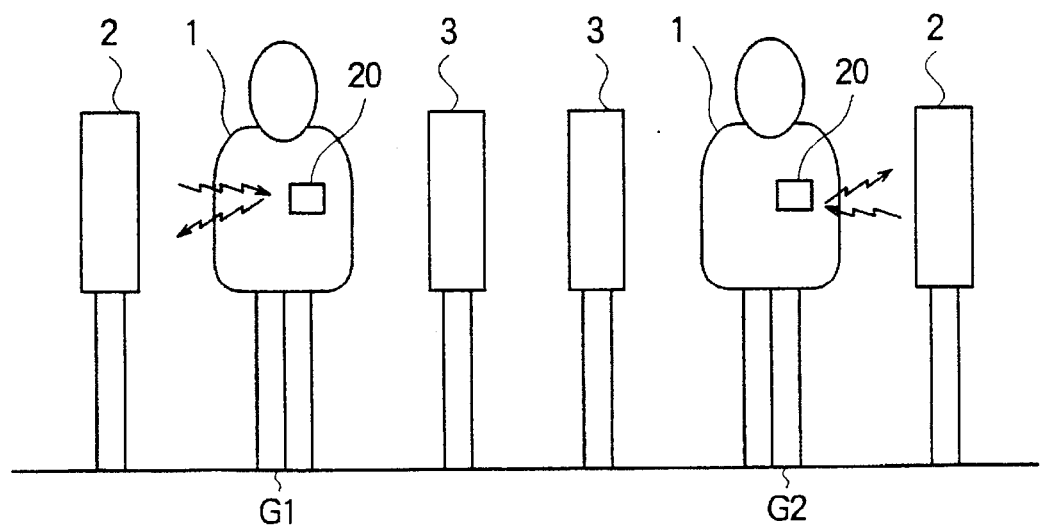
FIG. 15 schematically shows the gate facility to which a known noncontacting IC card system is applied.

FIG. 14 shows an antenna mechanism according to another embodiment of the invention. When mounting an antenna 16, it is in many cases fixed to antenna mounting supports 15 as shown in FIG. 14. If the support is made of a conductive material, a card outside the gate may respond, since long or medium electromagnetic waves have a tendency of propagating through a conductive material.

Thus, in this embodiment, the antenna mounting support 15 is formed by an insulating material such as wood, plastics, glass, or resin to prevent an electromagnetic wave from propagating to the outside of the gate through the support 15. Thereby, it is possible to prevent a card outside the gate from responding as a result that the electromagnetic wave leaks to the outside through the support 15.

As has been described, in the invention, the transmitting means is provided between two contiguous gates, i.e., on the inner side of the gates and the receiving means are provided toward the sides opposite to the transmitting means, i.e., on the outer sides of the gates. No dead zone is thus needed and an unnecessary communication area does not occur outside the gate. It is thereby possible to provide a noncontacting IC card system capable of achieving a gate facility occupying a relatively small area with very little space being wasted.

The transmitting means comprises a transmitting antenna provided between two contiguous gates and the receiving means comprises by receiving antennas on the gates provided respectively toward the sides opposite to the transmitting antenna. The transmitting antenna is shared by the two gates, and reception of a signal from the card is performed by each individual gate. It is thereby possible to provide a noncontacting IC card system capable of achieving a gate facility in which, in addition to small occupied area, an efficient communication may be performed.

Alternatively, the transmitting means comprises a transmitting antenna provided between two contiguous gates and the receiving means comprises a receiving antenna provided on one side of the two gates having a reception area covering the two gates. The transmitting antenna and the receiving antenna are respectively shared by the two gates. It is thereby possible to provide a noncontacting IC card system capable of achieving a gate facility at a lower cost in addition to a relatively small occupied area.

It is also possible in the invention to provide a gate facility based on the above described systems.

Further, in the invention, a conductive shielding body is provided on the outer side with respect to the gate of the antenna so as to eliminate a communication area outside the gate by cutting off electromagnetic waves. It is thereby possible to provide a reliable antenna mechanism where an interference with a card outside the gate does not occur.

The conductive shielding body is formed into a box covering the surfaces of the antenna except the surface for performing communication. It is thereby possible to provide a highly reliable antenna mechanism in which the size of the shielding body may be reduced and shielding effect for preventing the electromagnetic waves from coming out of the gate is furthermore improved.

The conductive shielding body is connected to a ground at the same electric potential as the receiving antenna. It is thereby possible to provide a highly reliable antenna mechanism in which the receiving antenna is less likely to be affected by noise due to the shielding body.

An antenna mounting support for mounting the antenna is formed by an insulating material. It is thereby possible to provide a highly reliable antenna mechanism in which a leakage of electromagnetic waves to the outside of the gate due to propagation through the support is prevented.

What is claimed is:

1. A noncontacting IC card system comprising:

a single transmitter provided between two contiguous gates;

receiving means provided on each of said two contiguous gates directed toward said single transmitter;

at least one noncontacting IC card for communicating with said single transmitter and receiving means on each of said two contiguous gates; and control means connected to said single transmitter and said receiving means for controlling communication with said noncontacting IC card and data processing.

2. The noncontacting IC card system according to claim 1, wherein said single transmitter comprises a transmitting antenna provided between said two contiguous gates and said receiving means comprises respective receiving antennas provided on said two contiguous gates directed toward said transmitting antenna.

3. The noncontacting IC card system according to claim 1, wherein said single transmitter comprises a transmitting antenna provided between said two contiguous gates and said receiving means comprises a receiving antenna provided on one side of said two contiguous gates and having a receiving area covering said two contiguous gates, said system further comprising gate discriminating means for detecting a gate having said noncontacting IC card therein based on receiving a signal from said noncontacting IC card.

4. The noncontacting IC card system according to claim 3, wherein said gate discrimination means comprises a voltage detection circuit connected to said receiving antenna.

5. The noncontacting IC card system according to claim 1, wherein said single transmitter said and receiving means respectively comprise antennas, said system further comprising an insulating antenna mounting support for mounting said antennas.

6. A gate facility for processing a noncontacting IC card passing the gate, said gate facility comprising:

a single transmitter provided between two contiguous gates;

receiving means provided on the gates directed toward said single transmitter; and control means connected to said transmitting means and said receiving means for communications with said noncontacting IC card and data processing.

7. The gate facility according to claim 6, wherein said single transmitter comprises a transmitting antenna provided between said two contiguous gates and said receiving means comprises respective receiving antennas provided on said two contiguous gates directed toward said transmitting antenna.

8. The gate facility according to claim 6, wherein said single transmitter comprises a transmitting antenna provided between said two contiguous gates and said receiving means comprises a receiving antenna provided on one side of said two contiguous gates and having a reception area covering said two gates, said gate facility further comprising gate discriminating means for detecting a gate having a noncontacting IC card therein in response to receiving voltage a signal from the noncontacting IC card.

9. The gate facility according to claim 8, wherein said gate discrimination means comprises a voltage detection circuit connected to said receiving antenna.

10. The gate facility according to claim 6, wherein said single transmitter and said receiving means respectively comprise antennas, said gate facility further comprising an insulating antenna mounting support for mounting said antennas.

* * * * *

UNITED STATES PATENT AND TRADEMARK OFFICE
CERTIFICATE OF CORRECTION

PATENT NO.   :   5,661,286
DATED        :   August 26, 1997
INVENTOR(S)  :   Fujioka It is certified that error appears in the above-indentified patent and that said Letters Patent is hereby corrected as shown below:

Item 57, Abstract, Line 4, after "gates" insert

--,--;

Item 57, Abstract, Line 7, after "gates" insert

--,--;

Column 10, Line 20, change "said and" to --and said--;

Line 49, change "receiving" to --a--;

Line 49, after "voltage" insert --from--;

Line 50, after "signal" insert --received--.

Signed and Sealed this

Seventh Day of April, 1998

Attest:

BRUCE LEHMAN

*Attesting Officer*          *Commissioner of Patents and Trademarks*